US009307594B2

(12) United States Patent
Kim et al.

(10) Patent No.: US 9,307,594 B2
(45) Date of Patent: Apr. 5, 2016

(54) APPARATUS FOR DRIVING LIGHT EMITTING DIODE HAVING A CURRENT SWITCH

(71) Applicant: GTC CO., LTD., Daejeon (KR)

(72) Inventors: Deogyong Kim, Daejeon (KR); Jungsoo Lee, Daejeon (KR); Sangdo Kim, Daejeon (KR)

(73) Assignee: GTC CO., LTD., Daejeon (KR)

( * ) Notice: Subject to any disclaimer, the term of this patent is extended or adjusted under 35 U.S.C. 154(b) by 0 days.

(21) Appl. No.: 14/519,912

(22) Filed: Oct. 21, 2014

(65) Prior Publication Data

US 2016/0050730 A1 Feb. 18, 2016

(30) Foreign Application Priority Data

Aug. 13, 2014 (KR) ........................ 10-2014-0105213

(51) Int. Cl.
*B41J 2/47* (2006.01)
*H05B 33/08* (2006.01)

(52) U.S. Cl.
CPC ........ *H05B 33/0824* (2013.01); *H05B 33/0809* (2013.01)

(58) Field of Classification Search
CPC ..... G06F 1/263; H02M 1/10; H05B 33/0809; H05B 33/0824
USPC .............. 347/237; 345/82; 315/306, 122, 297
See application file for complete search history.

(56) References Cited

U.S. PATENT DOCUMENTS 4,298,869 A * 11/1981 Okuno ............................ 345/82
8,207,685 B2 * 6/2012 Cheng et al. .................. 315/306
2014/0062317 A1 3/2014 Lee
2014/0125230 A1 * 5/2014 Shteynberg et al. .......... 315/122
2014/0239847 A1 * 8/2014 Kim et al. ..................... 315/297

FOREIGN PATENT DOCUMENTS

KR 10-2004-0084004 A 10/2004
KR 10-2012-0014741 A 2/2012
KR 10-2012-0125142 A 11/2012

* cited by examiner

*Primary Examiner* — Julian Huffman
*Assistant Examiner* — Carlos A Martinez
(74) *Attorney, Agent, or Firm* — Drinker Biddle & Reath LLP

(57) ABSTRACT

An apparatus for driving LEDs. The apparatus that drives a first LED unit having at least one LED and second LED unit connected to the first LED unit and having at least one LED comprises a rectifying unit for rectifying an AC power source connected to the first LED unit, a first current detector connected between the rectifying unit and the first LED unit and having its operation state changed depending on a level of current flowing through the first LED unit, a second current detector connected between the rectifying unit and the second LED unit and having its operation state changed depending on a level of current flowing through the second LED unit, and a reverse current protector connected between the first and second current detectors for providing a path to connect the first and second LED units in series.

4 Claims, 8 Drawing Sheets

PRIOR ART

PRIOR ART

PRIOR ART

PRIOR ART

APPARATUS FOR DRIVING LIGHT EMITTING DIODE HAVING A CURRENT SWITCH

CROSS-REFERENCE TO RELATED APPLICATION

This application claims priority to and the benefit of Korean Patent Application No. 10-2014-0105213, filed in the Korean Intellectual Property Office on Aug. 13, 2014, the entire contents of which are incorporated herein by reference.

FIELD

Disclosed herein is an apparatus for driving light emitting diodes.

BACKGROUND

Like general diodes, Light Emitting Diodes (LEDs) are turned on when a forward voltage having the level greater than a threshold voltage is applied thereto. When turned on, the LEDs conduct current and emit light.

Serial type LEDs, directly driven by voltage from an Alternate Current (AC) power source (or a source voltage) are connected to a full-wave rectifier, in which case, one or more LEDs are connected in series, or are in a combination of serial and parallel connections.

The LEDs are turned on and current flows through them when a voltage greater than the threshold voltage is applied thereto, but they are turned off and no current flows through them when a voltage applied is less than the threshold voltage.

For a cycle of the source voltage, the fact that time for which the LEDs are turned on is short reduces the luminous intensity of the LEDs and causes total harmonic distortion.

As the number of LEDs connected in series increases, the level of the voltage required to turn on the LEDs also increases and the time for which the LEDs are turned on gets shorter. This degrades the luminous intensity and worsens the total harmonic distortion, leading to an increase in manufacturing cost.

On the other hand, as the number of the LEDs connected in series decreases, the level of the voltage required to turn on the LEDs is reduced but overcurrent may flow through the LEDs, shortening the lifespan of the LEDs. In this case, voltage fluctuation of the AC power source may also cause the overcurrent.

There is a need to develop an apparatus for driving LEDs that is not affected by voltage fluctuation of a power source, increases luminous intensity of the LEDs, reduces the total harmonic distortion, prevents overcurrent, and reduces manufacturing costs.

FIG. 1 shows an LED driver circuit, in which a power source AC, a diode rectifier unit Dr, a current regulating resistor Rr, and an LED unit De having multiple LEDs are connected in series.

FIG. 2 shows waveforms of voltage (or source voltage) VAC and current IAC of the AC, a rectified voltage Vcc by the diode rectifier unit Dr, and a rectified current Icc flowing through the LED unit De.

Referring to FIG. 1, the source voltage VAC applied across the diode rectifier unit Dr is full-wave rectified and the rectified voltage Vcc is applied to the LED unit De via the resistance Rr.

When the rectified voltage Vcc is less than a total forward threshold voltage Vth1 for the LED unit De having multiple LEDs (i.e., the sum of forward threshold voltages for the respective LEDs), the LED unit De is turned off for certain time periods t1 and t3, as shown in FIG. 2, and current Icc does not flows though the LED unit De.

On the other hand, when the rectified voltage Vcc is greater than the forward threshold voltage Vth1 (for time t2), the LED unit De is turned on and current Icc starts to flow through the LED unit De, the level of the current Icc being equal to a value obtained by dividing the difference between the rectified voltage Vcc and the forward threshold voltage Vth1 by the resistance of the resistor Rr. As the rectified voltage Vcc increases, a problem arises that the current Icc flowing through the LED unit De may increase to more than a maximum permissible current.

As the level of a voltage required to turn on the LED unit De, i.e., the level of the forward threshold voltage Vth1 increases in proportion to the number of the LEDs connected in series, the turned-on section of the LED unit De becomes short.

This accentuates the total harmonic distortion and degrades the luminous intensity of the LED unit De.

When the forward threshold voltage Vth1 for the LED unit De is reduced or the source voltage VAC increases, a current greater than a permissible current may flow through the LED unit De, thus leading to reduction of the lifespan of the LED unit De and reliability of its operation.

The total harmonic distortion is a cause of various electric noises and is thus subject to global regulation. When the luminous intensity of the LED unit De decreases, more LEDs are required to make up for the decrease of the luminous intensity, which in turn increases the manufacturing cost.

FIG. 3 shows an LED driver circuit that improves the total harmonic distortion.

Referring to FIG. 3, a power source AC, a resistor R for current regulation, a first LED unit Da, and a second LED unit Db are connected in series. The first LED unit Da comprises two LEDs Da1 and Da2 connected in an inverse parallel form, and the second LED unit Db comprises two LEDs Db1 and Db2 also connected in an inverse parallel form.

The LED driver circuit of FIG. 3 introduces a capacitor C1 connected between the junction na of the resistor R and the first LED unit Da and the junction nb of the first and second LED units Da and Db, to improve the total harmonic distortion, and the source voltage $V_{AC}$ is applied across the first and second LED units Da and Db via the resistor R without any rectifier.

FIG. 4 shows waveforms of the source voltage VAC and current $I_{AC}$ applied from the source power AC, a voltage $V_R$ after the resistance R, a current $I_{Da}$ flowing through the first LED unit Da, and a current $I_{Db}$ flowing through the second LED unit Db.

When the level of the voltage $V_R$ is less than a forward threshold voltage Vth2, no current flows through the first LED unit Da, and when the voltage $V_R$ is equal to or greater than the forward threshold voltage Vth2, current $I_{Da2}$ flows through the forward LED Da2 of the first LED unit Da for a positive (+) half cycle of the source voltage $V_{AC}$ and current $I_{Da1}$ flows through the backward LED Da1 of the first LED unit Da for a negative (−) half cycle of the source voltage $V_{AC}$, the sum of the currents $I_{Da1}$ and $I_{Da2}$ being the current $I_{Da}$ of the first LED unit Da.

With the voltage $V_R$ less than the forward threshold voltage Vth2 applied, when the source voltage $V_{AC}$ increases in the positive direction, a charging current flows through the second LED unit Db via the capacitor C1, and even when the source voltage $V_{AC}$ increases in the negative direction, a discharging current flows through the second LED unit Db via the capacitor C1.

When the voltage $V_R$ is equal to or greater than the forward threshold voltage Vth2, current $I_{Db2}$ passed through the forward LED Da2 of the first LED unit Da flows through the forward LED Db2 of the second LED unit Db for a positive (+) half cycle of the source voltage $V_{AC}$ and current $I_{Db1}$ passed through the backward LED Da1 of the first LED unit Da flows through the backward LED Db1 of the second LED unit Db for a negative (−) half cycle of the source voltage $V_{AC}$. The sum of the currents $I_{Db}$1 and $I_{db2}$ is the current $I_{Db}$ of the second LED unit Db.

However, when the source voltage VAC is falling, no current flows through the capacitor C1 and when the voltage $V_R$ is less than the forward threshold voltage Vth2, no current flows through the first and second LED units Da and Db.

When the source voltage $V_{AC}$ is on the rise, charging current or discharging current is produced in the capacitor C1 by means of the second LED unit Db, which may reduce the total harmonic distortion to a certain extent. However, the capacitor C1 has a short lifespan and needs to endure high voltage, and it is difficult to make a product including the capacitor C1 compact due to the cost problem and the size of the capacitor C1.

The charging current or discharging current flows only through the second LED unit Db thus half of all the LEDs used to reduce the total harmonic distortion, which makes the current flowing through the second LED unit Db greater than the current flowing through the first LED unit Da. In this case, when a maximum current is supplied to the first LED unit Da, the second LED unit Db conducts overcurrent. This makes it hard to supply a current sufficient to drive the first and second LED units Da and Db of the LED driver circuit.

It is not possible to pass maximum permissible current for LED through the first and second LED units Da and Db, which reduces the luminous intensity.

In addition, when the source voltage $V_{AC}$ increases due to fluctuations, the level of the current flowing through the first and second LED units Da and Db may rise to more than the maximum permissible current. The current flowing through the LEDs may not reach the maximum permissible current in consideration of the fluctuation of the source voltage $V_{AC}$, thus reducing the luminous intensity.

SUMMARY

Keeping in mind the above problems occurring in the prior art, embodiments disclosed herein simplify configuration of an apparatus for driving Light Emitting Diodes (LEDs).

Embodiments also improve power factor in the apparatus for driving LEDs.

An embodiment provides an apparatus for driving Light Emitting Diodes (LEDs), in which the apparatus drives a first LED unit having at least one LED and a second LED unit connected to the first LED unit and having at least one LED, the apparatus comprising a rectifying unit for rectifying an Alternate Current (AC) power source connected to the first LED unit, a first current detector connected between the rectifying unit and the first LED unit and having an operation state thereof changed depending on a level of current flowing through the first LED unit, a second current detector connected between the rectifying unit and the second LED unit and having an operation state thereof changed depending on a level of current flowing through the second LED unit, and a reverse current protector connected between the first and second current detectors for providing a path to connect the first and second LED units in series, wherein the first and second LED units are in a parallel connection state or a serial connection state depending on operation states of the first and second current detectors.

The first current detector may comprise a resistor having an end connected to the rectifying unit and the other end connected to the first LED unit, a first transistor having the emitter connected to the end of the resistor, the base connected to the other end of the resistor, and the collector connected to the other end of the rectifying unit, and a second transistor having the gate connected to the collector of the first transistor, the source connected to the other end of the resistor, and the drain connected to an end of the reverse current protector.

The second current detector may comprise a resistor having an end connected to the rectifying unit and the other end connected to the second LED unit, a first transistor having the collector connected to an end of the rectifying unit, and a second transistor having the gate connected to the collector of the first transistor, the drain connected to the other end of the resistor, and the source connected to the other end of the reverse current protector.

The apparatus for driving LEDs may further comprise at least one constant current unit located at least one of between the rectifying unit and the first current detector and between the rectifying unit and the second current detector.

The at least one constant current unit, when located between the rectifying unit and the first current detector, may comprise a first transistor having the drain connected to the end of the rectifying unit, a first resistor having an end connected to the end of the rectifying unit and the other end connected to the gate of the first transistor, a second transistor having the collector connected to the other end of the first resistor and the base connected to the source of the first transistor, and a second resistor having an end connected to the source of the second transistor and the other end connected to the emitter of the second transistor and the first current detector.

The at least one constant current unit, when located between the rectifying unit and the second current detector, may comprise a second resistor having an end connected to the other end of the rectifying unit, a first transistor having the source connected to the other end of the second resistor, a second transistor having the emitter connected to the other end of the rectifying unit and the base connected to the other end of the second resistor, and a first resistor having an end connected to the collector of the second transistor and the gate of the first transistor and the other end connected between the drain of the first transistor and the second current detector.

In accordance with embodiments disclosed herein, a current switch is implemented to detect current flowing through a Light Emitting Diode (LED) when an alternate current (AC) power source is applied and enable all LEDs to conduct current even below a total forward threshold voltage. Driving time for LEDs is increased, thus reducing the total harmonic distortion and improving the luminous intensity.

Overcurrent due to voltage fluctuations is prevented, which contributes to increase in reliability of the lighting devices.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Embodiments will be described with reference to the accompanying drawings. It should be appreciated that embodiments may be implemented in various different forms, and are not limited to the embodiments described herein. In the accompanying drawings, portions unrelated to the description are omitted in order to clearly illustrate the embodiments.

Figure 1:
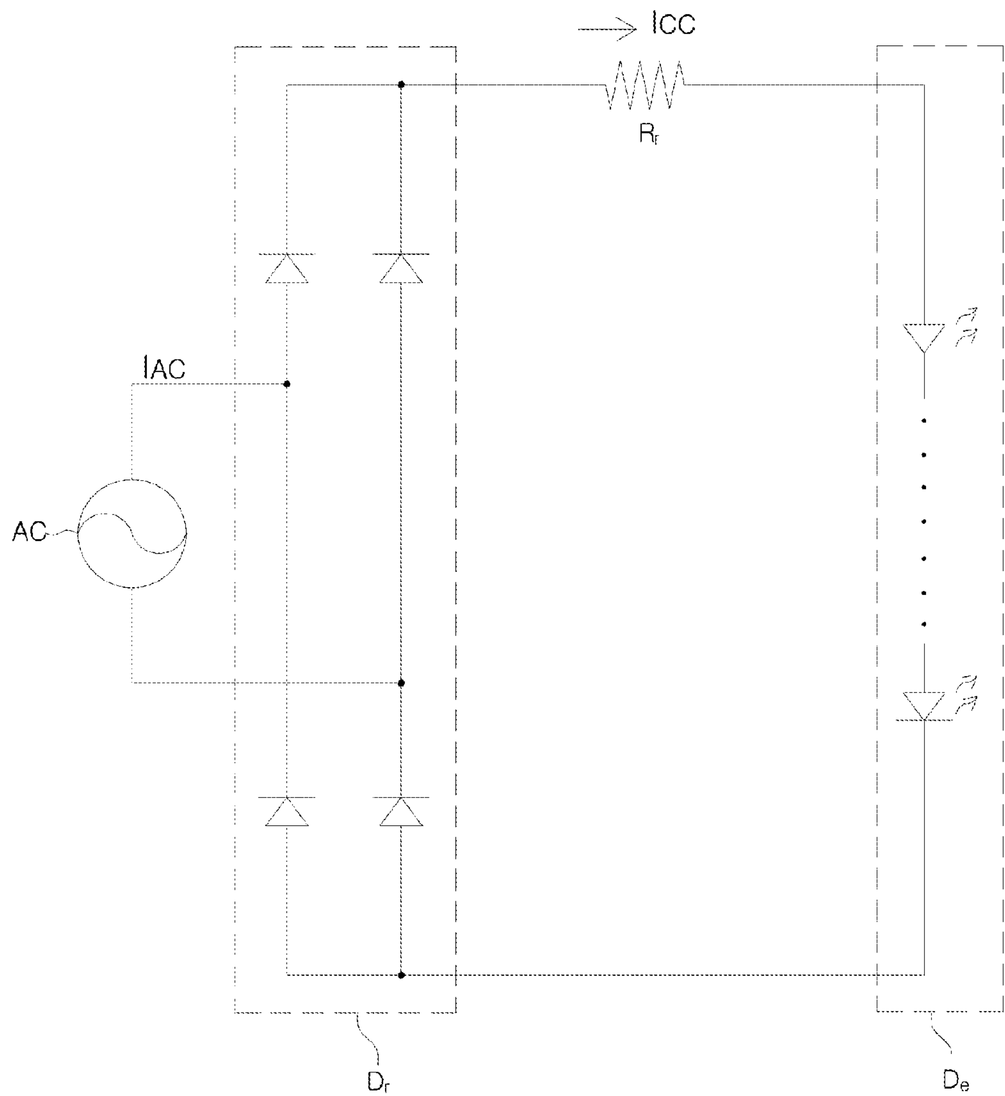
FIG. 1 shows an exemplary circuit diagram of a conventional apparatus for driving Alternate Current (AC) Light Emitting Diodes (LEDs)
Figure 2:
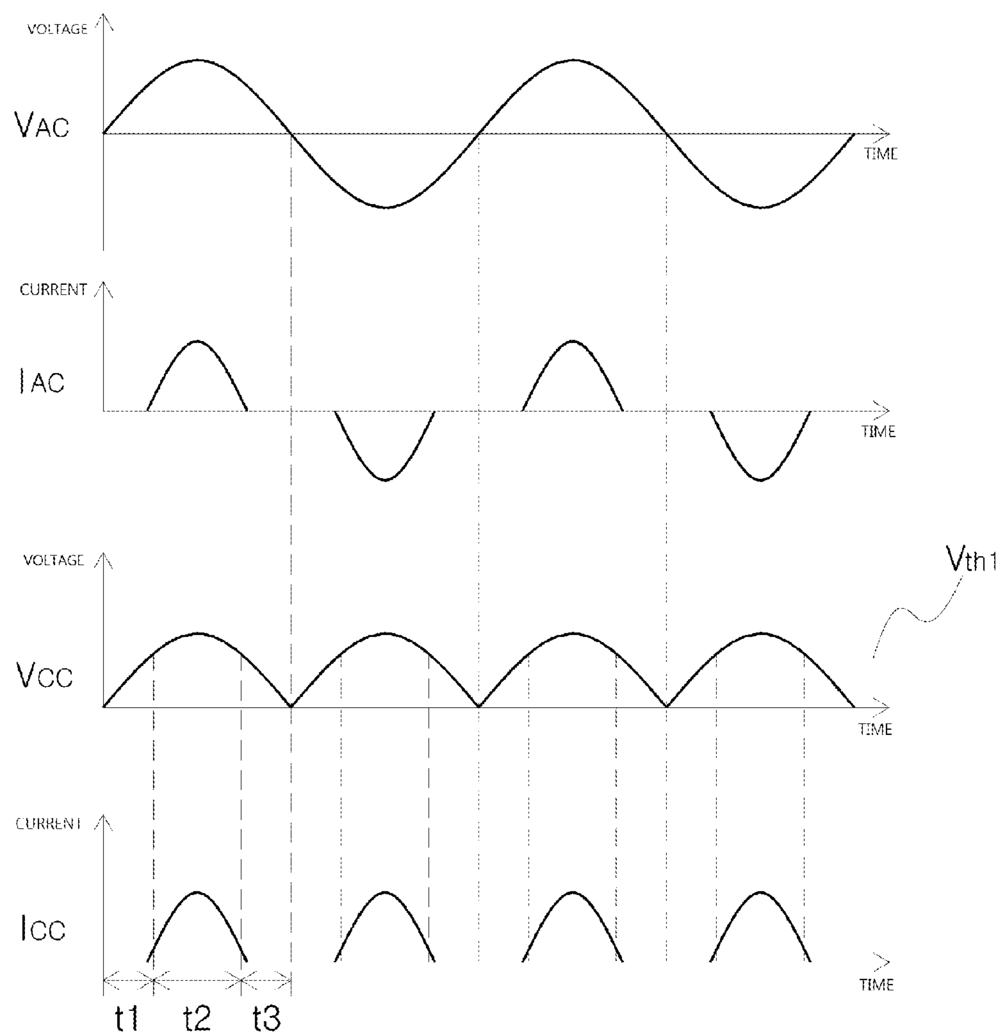
FIG. 2 shows waveforms of AC voltage, AC current, rectified voltage, and rectified current of FIG. 1.
Figure 3:
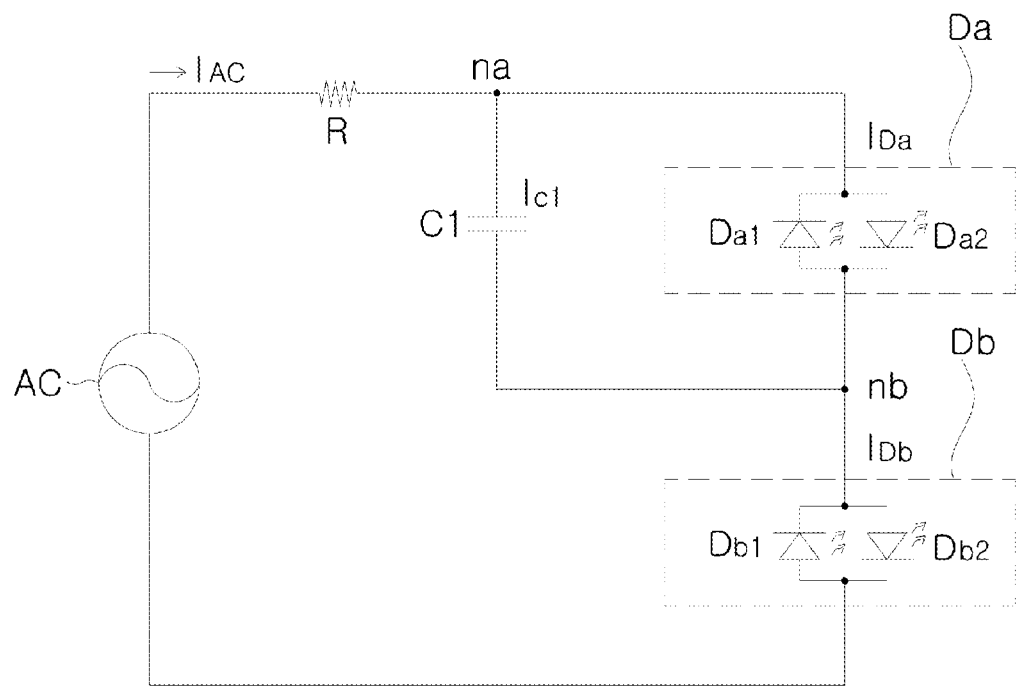
FIG. 3 shows another exemplary circuit diagram of a conventional apparatus for driving AC LEDs.
Figure 4:
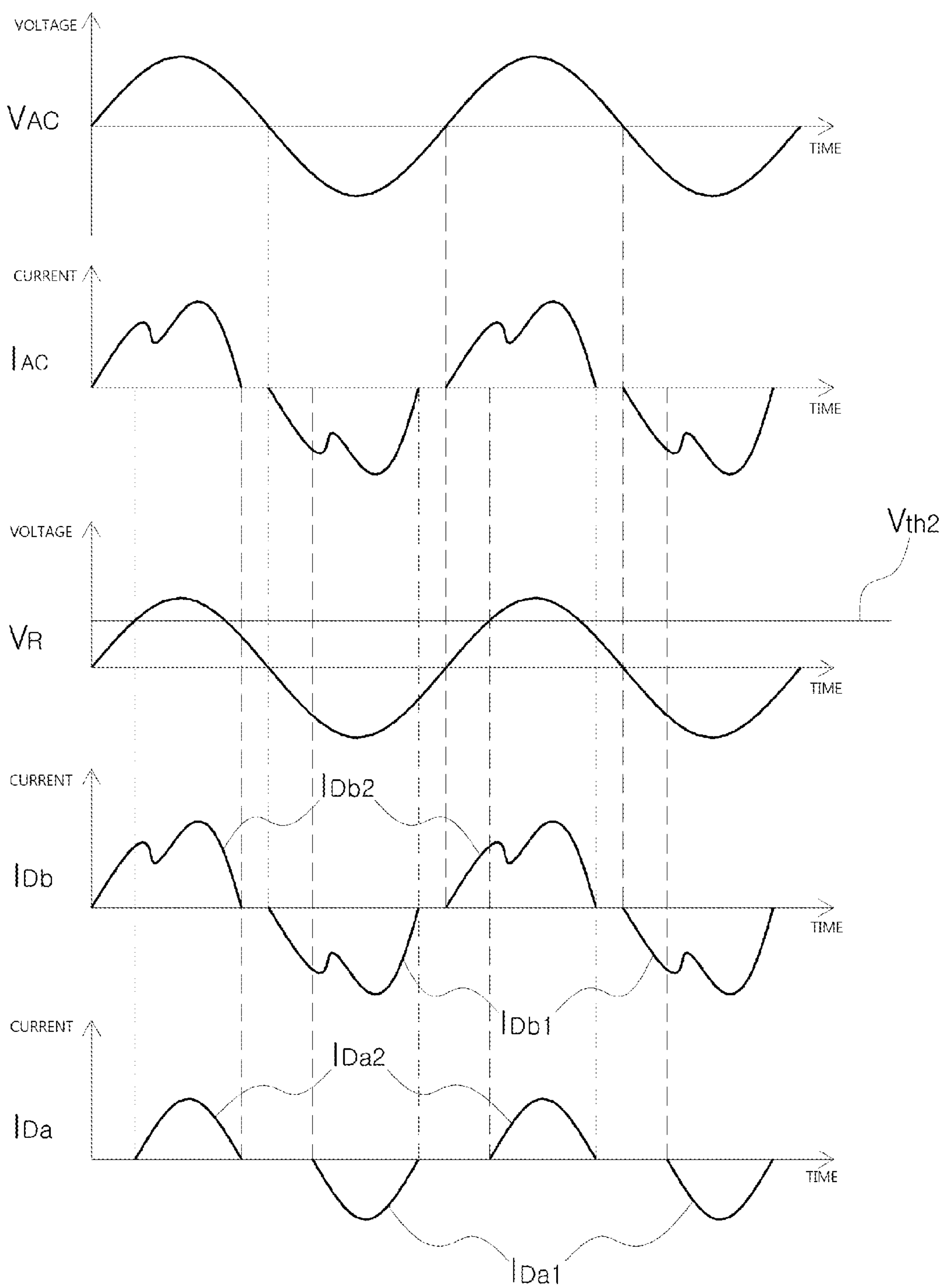
FIG. 4 shows waveforms of AC voltage, AC current, rectified voltage, and rectified current of FIG. 3.
Figure 5:
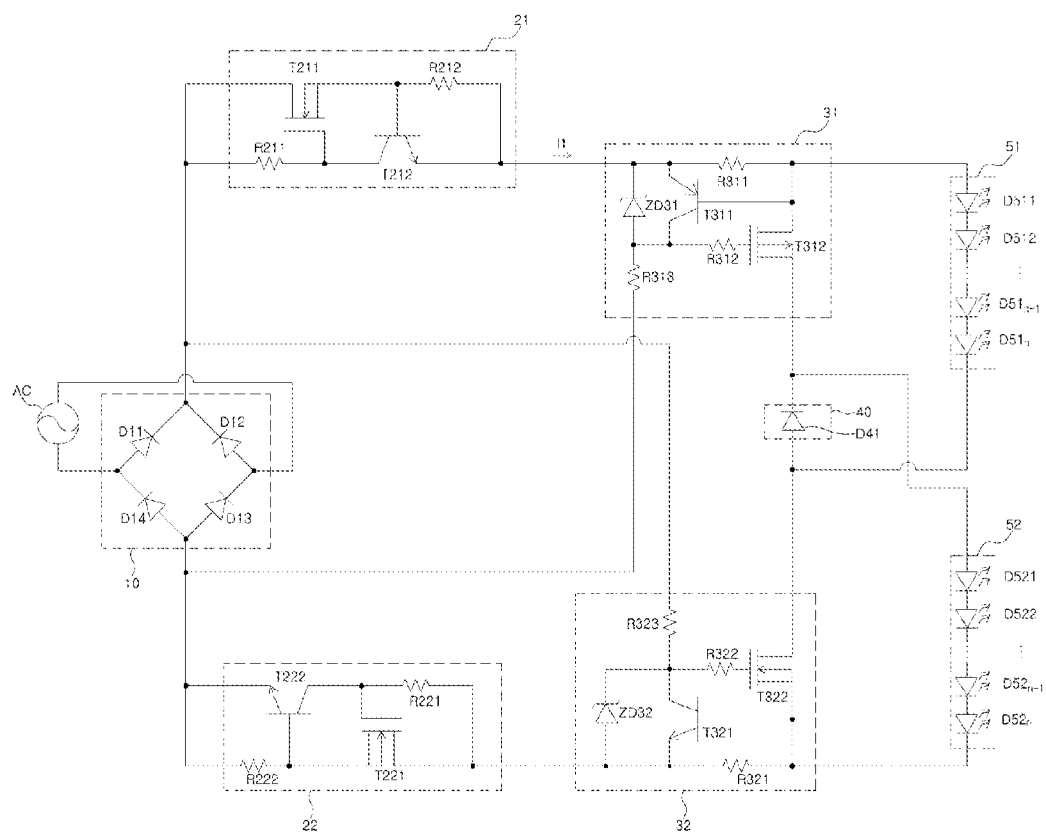
FIG. 5 shows a circuit diagram of an apparatus for driving LEDs, according to an embodiment disclosed herein.

FIG. 5 shows a circuit diagram of an apparatus for driving LEDs, according to an embodiment disclosed herein.

Referring to FIG. 5, the apparatus for driving LEDs comprises a rectifying unit 10 connected to an Alternate Current (AC) power source AC, first and second constant current units 21 and 22 connected to the rectifying unit 10, a first current detector 31 connected to the first constant current unit 21, a first LED unit 51 connected to the first current detector 31, a reverse current protector 40 connected to the first current detector 31, a second current detector 32 connected to the second constant current unit 22 and the reverse current protector 40, and a second LED unit 52 connected to the first and second current detectors 31 and 32.

The source voltage $V_{AC}$ from the source power source AC may be 110V or 220V.

The rectifying unit 10 is a full-wave rectifier, e.g., a bridge rectifier having four diodes D11-D14.

The rectifying unit 10 full-wave rectifies the source voltage $V_{AC}$ into a full-wave rectified voltage (or simply rectified voltage) Vcc.

The first and second constant current units 21 and 22 keep their output current constant, i.e., to be a current having a predetermined level, even if the rectified voltage Vcc rises to more than a set voltage. That is, the first and second constant current units 21 and 22 supply set current to the first and second current detectors 31 and 33 without regard to variations of the rectified voltage Vcc.

With the operation of the first and second rectifying units 21 and 22, the first and second LED units 51 and 52 are supplied with current up to a maximum permissible current.

Overcurrent due to variations of the source voltage $V_{AC}$ may not be applied to the first and second LED units 51 and 52, which increases the lifespan and luminous intensity of the lighting device having the first and second LED units 51 and 52.

For example, the first constant current unit 21 comprises a transistor (first transistor) T211 with the drain connected to an end of the rectifying unit 10, a resistor (first resistor) R211, an end of which is connected to the end of the rectifying unit 10 and the other end of which is connected to the gate of the transistor T211, a transistor (second transistor) T212 with the collector connected to the other end of the resistor R211 and the base connected to the source of the transistor T211, and a resistor (second resistor) R212, an end of which is connected to the source of the transistor T211 and the other end of which is connected to the emitter of the transistor T212.

For example, the second constant current 21 has the same components as the first constant current unit 21 in the similar structure, and includes a resistor (second resistor) R222, an end of which is connected to the other end of the rectifying unit 10, a transistor (first transistor) T221 with the source connected to the other end of the resistor R222, a transistor (second transistor) T222 with the emitter connected to the other end of the rectifying unit 10 and the base connected to the other end of the resistor R222, and a resistor (first resistor) R221, an end of which is connected to the collector of the transistor T222 and the gate of the transistor T221 and the other of which is connected to the drain of the transistor T221.

In the embodiment, the transistors T211, T221, T212, and T222 act as switching devices. Although the transistors T211 and T221 correspond to N channel metal oxide semiconductor filed effect transistors (MOSFETs) while the transistors T212 and T222 correspond to NPN bipolar transistors, the transistors T211, T221, T212, and T222 may be different types of switching devices than what are shown in the embodiment of FIG. 5.

Depending on the resistance of the resistor R212, R222, the operation of the transistor T212, T222 may vary and the constant current operation states of the first or second constant current units 21, 22 are controlled. Thus, the level of the current restricted by each of the first and second constant current units 21, 22 is determined according to the resistance of the corresponding resistor R212, R222.

The constant current units 21, 22 are not only limited to what are illustrated in FIG. 5 but may have different configurations or only a single constant current unit may be used.

The first current detector 31 detects current flowing through the first LED unit 51 and the second current detector 32 detects current flowing through the second LED unit 52, to control turned-on/off states of the first and second LED diode units 51 and 52.

The first current detector 31 comprises a resistor R311, one end of which is connected to the emitter of the transistor T212 of the first constant current unit 21; a transistor (first transistor) T311 with the emitter connected to the end of the resistor R311 and the base connected to the other end of the resistor R311; a Zener diode ZD31 with the anode connected to the collector of the transistor T311 and the cathode connected to the emitter of the transistor T311; a resistor R312, one end of which is connected to the collector of the transistor T311; a transistor (second transistor) T312 with the gate connected to the other end of the resistor R312 and the drain connected to the other end of the resistor R311; and a resistor R313, one end of which is connected to the anode of the Zener diode ZD31 and the other end of which is connected to the end of the rectifying unit 10.

The second current detector 32 comprises a resistor R321, one end of which is connected to the drain of the transistor T221 of the second constant current unit 22; a transistor T321 with the emitter connected to the end of the resistor R321 and the base connected to the other end of the resistor R321; a Zener diode ZD32 with the cathode connected to the collector of the transistor T321 and the anode connected to the emitter of the transistor T321; a resistor R322, one end of which is connected to the collector of the transistor T321; a transistor T322 with the gate connected to the other end of the resistor R322 and the source connected to the other end of the resistor R321; and a resistor R323, one end of which is connected to the cathode of the Zener diode ZD32 and the end of the resistor R322 and the other end of which is connected to the other end of the rectifying unit 10.

The switching device, the transistor T312 of the first current detector 31, may be a P-channel MOSFET; the switching device, the transistor T322 of the second current detector 32 may be an N-channel MOSFET; the transistor T311 of the first current detector 31 may be a PNP bipolar transistor; and the transistor T321 of the second current detector may be an NPN bipolar transistor, but the transistors T311, T312, T321, and T322 may be different types of switching devices than those shown herein.

The first and second current detectors 31 and 32 operate depending on the level of a current based on the rectified voltage Vcc, and control the operating states of the first and second LED units 51 and 52 to be in the form of parallel driving or serial driving.

Operating states of the transistor T311, T321 are changed according to the resistance of the resistor R311, R321, thus controlling the operating states of the first and second LED units 51 and 52.

The reverse current protector 40 comprises a diode D41 connected between the first and second current detectors 31 and 32 in the reverse direction.

The cathode of the diode D41 is connected to the source of the transistor T312 of the first current detector 31 and the anode of the diode D41 is connected to the drain of the transistor T322 of the second current detector 32.

The reverse current protector 40 provides a current flow path from the first LED unit 51 to the second LED unit 52 by electrically disconnecting or connecting the first and second LED units 51 and 52 for parallel driving or serial driving when the parallel or serial driving for the first and second LED units 51 and 52 is performed according to the operating states of the first and second current detectors 31 and 32.

The first LED unit 51 comprises one or more LEDs LED511-LED51*n* connected in series between the resistor R311 of the first current detector 31 and the diode D41 of the reverse current protector 40 in the forward direction.

The second LED unit 52 comprises one or more LEDs LED521-LED52*n* connected in series between the source of the transistor T312 of the first current detector 31 and the resistor R321 of the second current detector 32 in the forward direction.

Each of the LEDs LED511-LED51*n* and LED521-LED52*n* conducts and emits light when a voltage greater than its threshold voltage is applied thereto.

Operations of the apparatus for driving LEDs in accordance with the embodiment will now be described in more detail in connection with FIG. 6.

Figure 6:
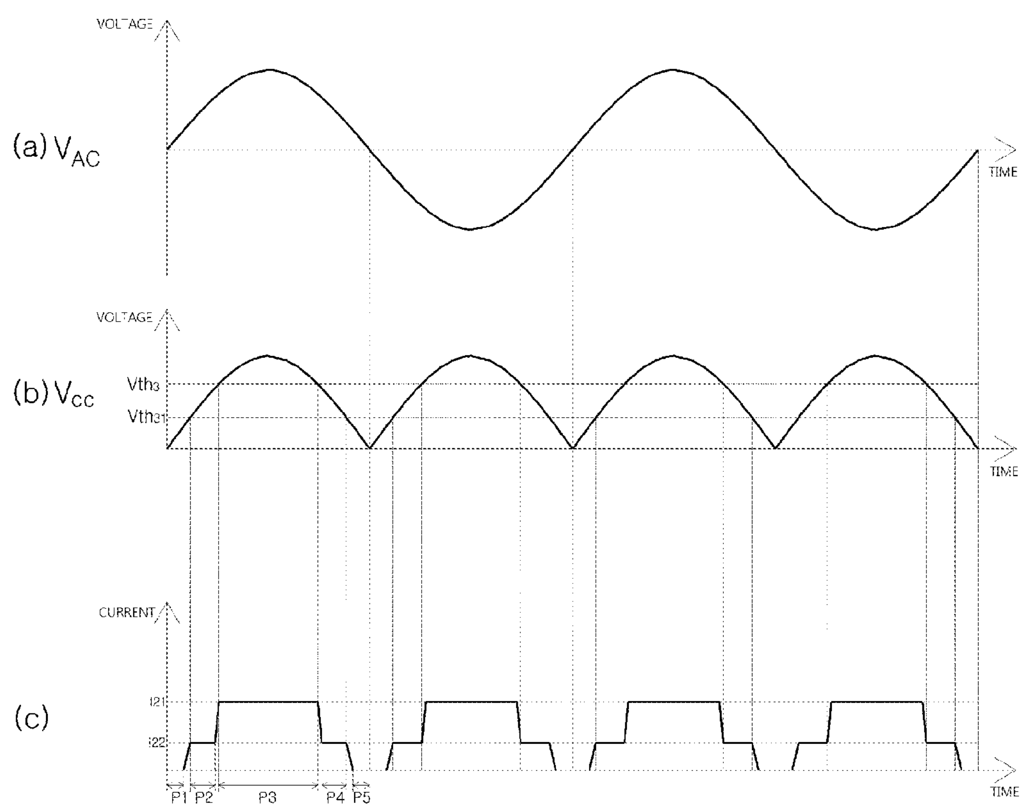
FIG. 6 shows waveforms of AC voltage, rectified voltage, and current flowing through an LED unit of FIG. 5.

First, when the voltage $V_{AC}$ of the AC power source, as shown in (a) of FIG. 6 is applied across the rectifying unit 10, the rectifying unit 10 that full-wave rectifies an AC signal into a Direct Current (DC) signal outputs the rectified voltage Vcc as shown in (b) of FIG. 6.

The rectified voltage Vcc is applied to the first and second constant current units 21 and 22, at least one of which outputs current I1 having a corresponding level.

When the rectified voltage Vcc as shown in (b) of FIG. 6 is applied to the first and second current detectors 31 and 32 via the first and second constant current units 21 and 22, operating states of the first and second current detectors 31 and 32 are determined according to the level of the current I1.

In (b) of FIG. 6, a set voltage Vth31 is a voltage required to operate all the LEDs LED511-LED51*n* or LED521-LED52*n* included in the first or second LED unit 51 or 52 (under assumption that the first and second LED units 51 and have the same configurations) i.e., a forward threshold voltage for each LED unit 51 or 52.

As already described above, the level (i.e., an magnitude) of current I22 flowing through the resistors R311, R321 is determined depending on the resistance of the resistors R311, R321, which determines turn-on and turn-off time of the transistors T311, T321. The set voltage Vth31 may be adjusted depending on the resistance of the resistors R311, R321.

Until the rectified voltage Vcc reaches the set voltage Vth31, both the first and second LED units 51 and 52 remain turned off and do not emit light.

As the voltage applied to the resistors R311, R321 increases or decreases, the transistors T311, T321 remain turned off, which makes the transistors T312, T322 remain turned on.

As the transistors T312, T322 are turned on, a closed loop is created that connects the turned-on transistor T312, the second LED unit 52, and the second constant current unit 22 while a closed loop is created that connects the first LED unit 51, the turned-on transistor T322, the second LED unit 52, and the second constant current unit 22, leaving the first and second LED units 51 and 52 connected in parallel with each other.

While the first and second LED units 51 and 52 remain in the parallel connection state, since the rectified voltage Vcc has not reached the set voltage Vth31, both the first and second LED units 51 and 52 keep themselves turned off.

Both the first and second LED units 51 and 52 are turned off and no current flows through the first and second LED units 51 and 52 (see section P1 in (c) of FIG. 6).

Next, as previously described, while the first and second LED units 51 and 52 remain in the parallel connection state, when the rectified voltage Vcc reaches the set voltage Vth31, it means that the level of the rectified voltage Vcc reaches the forward threshold voltage for each of the LED units 51 and 52 and thus all of the LED units 51 and 52 are turned on and emit light.

According to the turned-off operations of the first and second LED units 51 and 52, when the voltage applied across the resistor R311, R321 drops or rises, changing the turned-off transistor T311, T321 to be turned on, the changes cause the turned-on transistor T312, T322 to be turned off.

As the transistors T312, T322 are turned off, a closed loop is created connecting the first LED unit 51, the diode D41 of the reverse current protector 40, the second LED unit 52, and the second constant current unit 22, thereby leaving the first and second LED units 51 and 52 in the serial connection state.

As the first and second LED units 51 and 52 are changed into the serial connection state from the parallel connection state, a driving voltage to turn on all the LEDs 511-51*n* and 521-52*n* connected in series requires a total forward threshold voltage Vth3, which is the sum of forward threshold voltages for the LED units 51 and 52.

At this time, although the rectified voltage Vcc has not yet reached the total forward threshold voltage Vth3, each of the first and second LED units 51 and 52 left in turned-on state maintains the saturation state and thus remains turned on.

As the level (i.e., the magnitude) of the voltage across the resistor R311, R321 varies, the transistors T311, T321 are turned off again and the transistors T312, T322 are turned on.

While the transistors T312, T322 remain turned on, the aforementioned two closed loops are created, in which the first and second LED units 51, 52 are put back into the parallel connection state and thus changed reliably into the turned-on state.

In the parallel connection state of the first and second LED units 51, 52, the LEDs D511-D51*n*, D521-D52*n* contained in the first and second LED units 51, 52 are all turned on and consume current, which in turn puts the transistors T311, T321 back into the turned-on state and the transistors T312, T322 back into the turned-off state, thus changing the first and second LED units 51, 52 back into the serial connection state, as described above. As already mentioned above, even in the serial connection state, the first and second LED units 51, 52 remain turned on.

If the level of the rectified voltage Vcc is greater than the set voltage Vth31 and less than the total forward threshold voltage Vth3, the first and second LED units 51, 52 alternate between the parallel connection state and the serial connection state depending on the operations of the first and second current detectors 31, 32, and the current I22 flowing through the first and second LED units 51, 52 has a level for driving each of the LED units 51, 52 leaving them turned on.

The waveform of the current flowing through the first and second LED unit 51, 52 is under a condition where threshold voltage Vth31≤rectified voltage Vcc<total forward threshold voltage Vth3 maintains a section P2 in (c) of FIG. 6).

Even though the rectified voltage Vcc does not reach the total forward threshold voltage Vth3, the first and second LED units 51, 51 are controlled to be connected in parallel and turned on.

This increases lighting time of the first and second LED units 51, 52, thus improving the luminous intensity, reducing total harmonic distortion, and improving the power factor in the first and second LED units 51, 52.

When the rectified voltage Vcc increases to the total forward threshold voltage Vth3 for the first and second LED units 51, 52, LEDs LED511-LED51*n*, LED521-LED52*n* of the first and second LED units 51, 52 connected in series are all turned on. That is, the first and second LED units 51, 52 emit light in the serial connection state.

In a section where the total forward threshold voltage Vth3 is Vth3≤the rectified voltage Vcc, the transistors T311, T321 of the first and second current detectors 31, 32 maintain the turned-on state and transistors T312, T322 maintain the turned-off state, which maintains the serial connection state of the first and second LED units 51, 52 and thus keeps the first and second LED units 51, 52 turned on (see section P3 of (c) of FIG. 6).

In this case, since the first and second LED units 51, 52 keep themselves turned on in the serial connection state, the level of the current flowing through the first and second LED units 51, 52 is greater than current level I22.

Due to the increment of the rectified voltage Vcc, as the level of current flowing through the first and second LED units 51, 52 exceeds the set current I21 determined based on the resistor R212, R222 of the first and second constant current units 21, 22, at least one of the first and second constant current units 21, 22 may be activated.

When the level of the rectified voltage Vcc exceeds a voltage (e.g., the total forward threshold voltage Vth3) corresponding to the set current I21, at least one of the transistors T212, T222 of the first and second constant current units 21, 22 changes from a turned-off state to a turned-on state while the transistors T211, T221 change from a turned-on state to a turned-off state.

The rectified voltage Vcc is applied to the first and second current detectors 31, 32 via the resistors R211, R221 and transistors T212, T221 of the respective constant current units 21, 22, such that a constant current not greater than the set current I21 is applied to the first and second current detectors 31, 32.

The first and second constant current units 21, 22 are identically designed and manufactured, but in practice, their properties may not be perfectly the same due to their surrounding conditions or permissible error differences of individual components.

Among the first and second constant current units 21, 22, one having resistance of the resistor R212 or R222 substantially greater than the other or having lower base-emitter voltage of the transistor T212 or T222 than the other may be activated first.

When the set current may not be supplied to the first and second current detectors 31, 32 with activation of only the single constant current unit 21 or 22, due to occurrence of instantaneous overvoltage, the other constant current unit 21 or 22 having been inactivated is activated together and thus the current exceeding the set current may be dissipated by both of the two constant current units 21, 22.

This prevents damage to the constant current units 21, 22 due to instantaneous overcurrent. Since one of the two constant current units 21 and 22 is randomly activated depending on the state of the apparatus for driving LEDs, the lifespan of each constant current unit 21, 22 may be longer as compared to when only one constant current unit is used.

The level of the current I22, I21 flowing through the first and second LED unit 51, 52 is determined primarily based on the resistance of the resistor R311 or R321 of the first and second current detector 31, 32 and secondarily based on the resistance of the resistor R212, R22 of the first and second constant current unit 21, 22.

To normally operate the apparatus for driving LEDs, the level of the current determined based on the resistance of the resistor R311 or R321 of the first or second current detector 31 or 32 needs to be less than the level of the current determined based on the resistance of the resistor R212 or R222 of the first or second constant current unit 21 or 22. Thus, the resistance of the resistor R212 or R222 needs to be less than that of the resistor R311 or R321.

With those operations of the apparatus for driving LEDs, the first and second LED units 51, 52 may be driven in the parallel state, parallel to serial switching state, and serial state depending on variations of the rectified voltage Vcc, and the level of the current flowing through the first and second LED units 51, 52 also varies in synchronization with the variation of the rectified voltage Vcc. This varies operating state of the first and second LED units 51, 52, leading to significant improvement in power factor.

In FIG. 5, the Zener diodes ZD31, ZD32 of the first and second current detectors are used to protect the respective transistors T311, T321 by safely controlling the emitter-collector voltage of the respective transistors T311, T321, and the resistors R312, R312 are used to protect the respective transistors T312, T322 by safely controlling the drain-source voltage of the respective transistors T312, T322. The resistors R313, R323 are used to maintain a constant voltage across the respective Zener diodes ZD31, ZD32.

Alternatively, at least one of the components ZD31, ZD32, R312, R322, R313, R323 may be omitted.

In (c) of FIG. 6, operations of the apparatus for driving LEDs in sections P4 and P5 are the same as those in sections P2 and P1, as described above, respectively, so the description in connection with the sections P4 and P5 will be omitted herein.

As shown in FIGS. 5 and 6, currents I21, I22 flowing through the first and second LED units 51, 52 go through two stages of current variation, which are determined based on the resistors R311, R321 of the first and second current detectors 31, 32 and resistors R212, R222 of the first and second constant current units 21, 22.

If necessary, it may be possible to vary the current flowing through the first and second LED units 51, 52 to be more synchronized to the variation of the rectified voltage Vcc by regularly changing the configurations of the first and second current detectors 31, 32 and increasing the number of current variation steps.

To increase the number of current variation steps by p, where p=1, 2, 3, 4, 5, . . . , the number of the resistors R311, R321 and transistors T311, T321 needs to be increased each by p, the number of transistors T312, T322 by 2P-1, and the number of LED units by 2p.

For example, to increase the current variation steps by one (p=1) to three steps, e.g., I21, I22, I23, resistors R311, R321 and transistors T311, T321 of the respective current detectors are each increased by one to two in number, transistors T312, T322 of respective current detectors by one to three in number, and LED units by two to four.

In this case, a forward threshold voltage for each LED unit maintains half the previously set forward threshold voltage.

Figure 7:
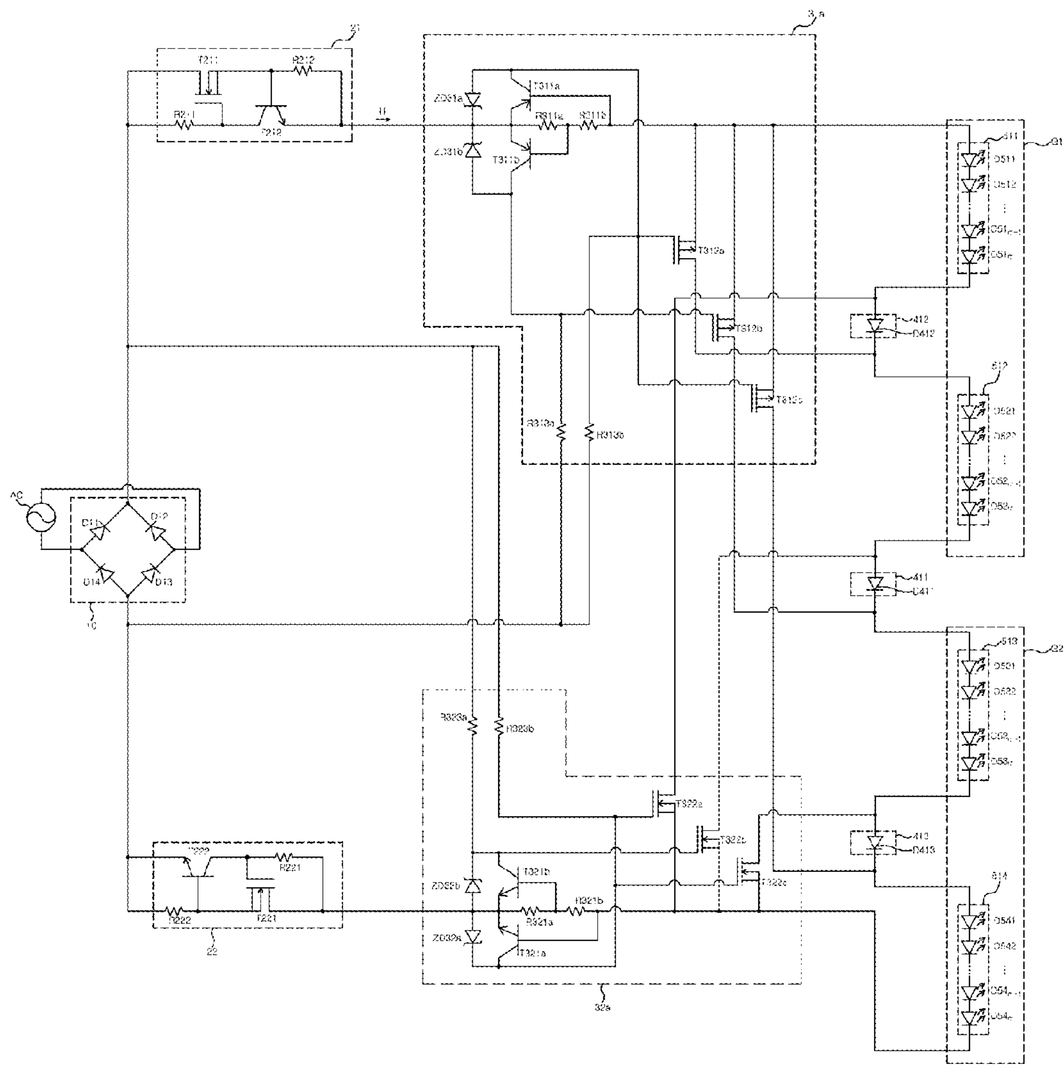
FIG. 7 shows a circuit diagram of an apparatus for driving LEDs, according to another embodiment.

FIG. 7 shows a circuit diagram of an apparatus for driving LEDs, resulting from an increase in the current variation steps by one to three steps I21, I22, I23 compared to the case of FIG. 6.

As described above in connection with FIG. 5, the apparatus for driving LEDs of FIG. 7 also includes rectifying unit 10, first and second constant current units 21, 22, first and second current detectors 31*a*, 32*a*, LED units 511-514, and reverse current protectors 41-43.

The rectifying unit 10 and first and second constant current units 21, 22 have the same configurations as what are shown in FIG. 5.

The first and second current detectors 31*a*, 32*a* are similar to the current detectors 31, 32 shown in FIG. 5, respectively, except that one more pair of transistors and resistors T311*b* and R311*b*, or T321*b* and R321*b* are included in addition to the existing pair of transistors and resistors T311*a* and R311*a* or T321*a* and R321*a* and that the number of transistors of each current detector 31*a* or 32*a* that directly controls the serial and parallel connection states of the multiple LED units 511-514 is increased from one T312 or T322 to three T312*a*, T312*b*, T312*c* or T322*a*, T322*b*, T322*c*.

The first current detector 31*a* comprises transistors T311*a*, T311*b*, T312*a*, T312*b*, T312*c*, resistors R311*a*, R311*b*, R313*a*, R313*b*, and Zener diodes ZD31*a*, ZD31*b*, which are connected as shown in FIG. 7.

Referring to FIG. 7, the first current detector 31*a* comprises a resistor R311*a*, one end of which is connected to the emitter of the transistor T212 of the first constant current unit 21; a resistor 311*b*, an end of which is connected to the other end of the resistor R311*a*; a transistor T311*a* with the emitter connected to the end of the resistor R311*a* and the base connected to the other end of the resistor R311*b*; a transistor T311*b* with the emitter connected to the end of the resistor R311*a* and the base connected to the other end of the resistor R311*a*; a Zener diode ZD31*a* with the anode connected to the collector of the transistor T311*a* and the cathode connected to the emitter of the transistor T311*a*; a Zener diode ZD31*b* with the anode connected to the collector of the transistor T311*b* and the cathode connected to the emitter of the transistor T311*b*; a transistor T312*a* with the source connected to the other end of the resistor R311*b* and the gate connected to the collector of the transistor T311*a*; a transistor T312*b* with the source connected to the other end of the resistor R311*b* and the gate connected to the collector of the transistor T311*b*; a transistor T312*c* with the source connected to the other end of the resistor R311*b* and the gate connected to the collector of the transistor T311*b*; a resistor R313*a*, one end of which is connected to the collector of the transistor T311*b* and the other end of which is connected to the other end of the rectifying unit 10; and a resistor R313*b*, one end of which is connected to the collector of the transistor T311*a* and the other end of which is connected to the other end of the rectifying unit 10.

The second current detector 32*a* comprises a resistor R321*a*, one end of which is connected to the drain of the transistor T221 of the second constant current unit 22; a resistor 321*b*, an end of which is connected to the other end of the resistor R321*a*; a transistor T321*a* with the emitter connected to the end of the resistor R321*a* and the base connected to the other end of the resistor R321*b*; a transistor T321*b* with the emitter connected to the end of the resistor R321*a* and the base connected to the other end of the resistor R321*a*; a Zener diode ZD32*a* with the anode connected to the collector of the transistor T321*a* and the cathode connected to the emitter of the transistor T321*a*; a Zener diode ZD32*b* with the cathode connected to the collector of the transistor T321*b* and the anode connected to the emitter of the transistor T321*b*; a transistor T322*a* with the source connected to the other end of the resistor R321*b* and the gate connected to the collector of the transistor T321*a*; a transistor T322*b* with the source connected to the other end of the resistor R321*b* and the gate connected to the collector of the transistor T321*b*; a transistor T322*c* with the source connected to the other end of the resistor R321*b* and the gate connected to the collector of the transistor T321*b*; a resistor R323*a*, one end of which is connected to the collector of the transistor T321*b* and the other end of which is connected to the other end of the rectifying unit 10; and a resistor R323*b*, one end of which is connected to the collector of the transistor T321*a* and the other end of which is connected to the one end of the rectifying unit 10.

Compared to FIG. 5, functions of the transistors T311*a*, T311*b* of the first current detector 31*a* are the same as the function of the transistor T311; functions of the resistors R311*a*, R311*b* are the same as the function of the resistor R311; and functions of the transistors T312*a*, T312*b*, T312*c* are the same as the function of the transistor T312. In FIG. 7, the resistor R312 is omitted, and it is also possible to omit the Zener diodes ZD31*a*, ZD31*b*.

Functions of the transistors T321*a*, T321*b* of the second current detector 32*a* are the same as the function of the transistor T321 of the second current detector 32 of FIG. 5; functions of the resistors R321*a*, R321*b* are the same as the function of the resistor R321; and functions of the transistors T322*a*, T322*b*, T322*c* are the same as the function of the transistor T322. The resistor R322 is also omitted in the second current detector 32*a*, and it is also possible to omit the Zener diodes ZD32*a*, ZD32*b* and resistors R323*a*, R323*b*.

The number of the LED units 511-514 are increased by two to four as compared to that in FIG. 5; and as already discussed above, the level of the forward threshold voltage for each LED unit 511-514 is half the level of the forward threshold voltage for each LED unit 51, 52 of FIG. 5.

When LEDs included in the LED units 51, 52, 511-514 have the same properties, a total number m of LEDs for each LED unit 511, 512, 513 or 514 may be half the total number n of LEDs for each LED unit 51 or 52.

For controlling the parallel connection and serial connection among the LED units 511-514, the number of the reverse current protectors 411-413 may vary in proportion to the number of the LED units. A total of three reverse current protectors are required in the embodiment of FIG. 7.

The reverse current protectors 411-413 comprise diodes D411, D412, D413, respectively, each of which is connected between adjacent two LED units 511-514 in forward direction.

The diode D412 of the reverse current protector 412 has the anode connected to the drain of the transistor T322*a* of the second current detector 32*a* and the cathode connected to the drain of the transistor T312*a* of the first current detector 31*a*.

The diode D411 of the reverse current protector 411 has the anode connected to the drain of the transistor T322*b* of the second current detector 32*a* and the cathode connected to the drain of the transistor T312*b* of the first current detector 31*a*.

The diode D413 of the reverse current protector 413 has the anode connected to the drain of the transistor T322*c* of the second current detector 32*a* and the cathode connected to the drain of the transistor T312*c* of the first current detector 31*a*.

Operations of the apparatus for driving LEDs in accordance with the embodiment of the present invention will now be described in more detail in connection with FIG. 8.

Figure 8:
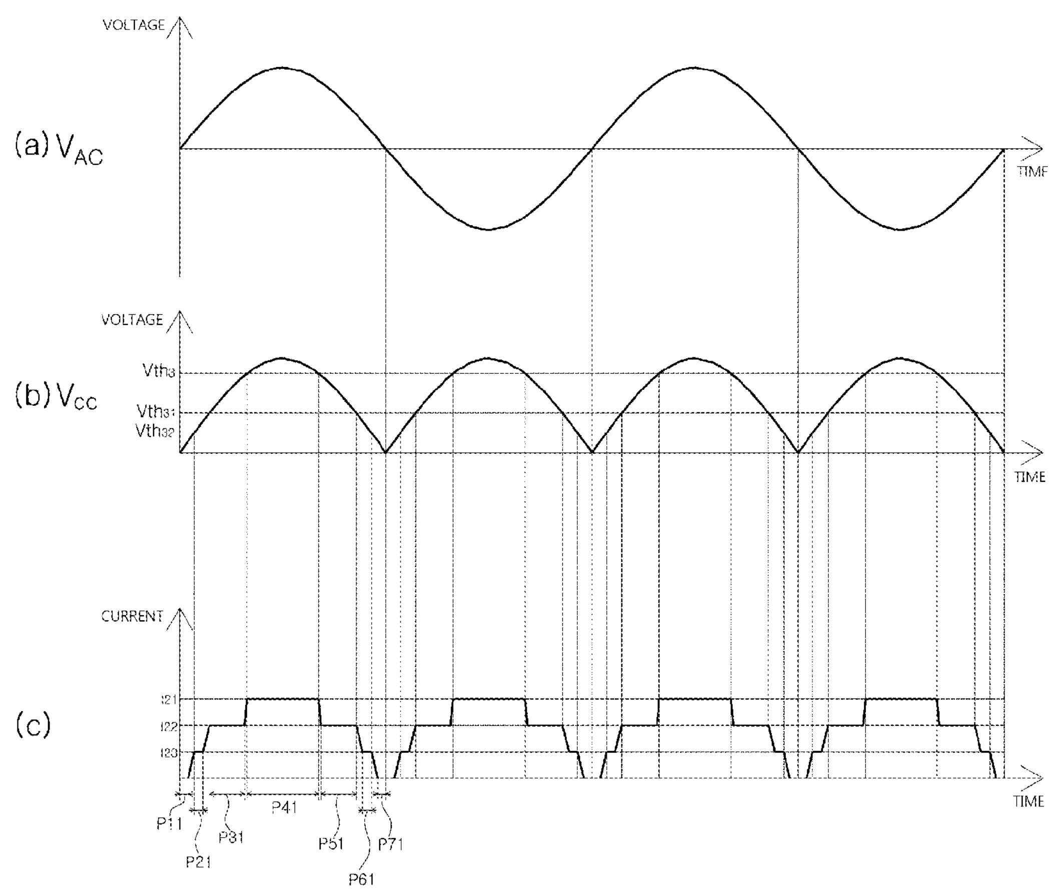
FIG. 8 shows waveforms of AC voltage, rectified voltage, and current flowing through an LED unit of FIG. 7.

Referring to FIG. 8, the level of the current flowing in the first stage I23 is determined by the resistance of the resistors R311*a* and R311*b*, R321*a* and R321*b* connected in series in each current detector 31*a* or 32*b*, and thus the set voltage Vth32 across the multiple LED units 511-514 when the first stage current I23 starts to flow is adjusted by the resistance of the resistors connected in series R311*a* and R311*b*, R321*a* and R321*b*.

The level of the current flowing in the second stage I22 is determined by the resistance of the resistor R311*a*, R321*a* in each current detector 31*a*, 32*b*, and the set voltage Vth31 across the multiple LED units 511-514 when the second stage current I22 starts to flow is adjusted by the resistance of the resistor R311*a*, R321*a*.

As described above in connection with FIG. 5, the level of the current flowing in the third stage I21 is determined by the resistance of the resistor R212, R222 of the first or second constant current unit 21, 22, and at this time, the level of the rectified voltage Vcc corresponds to the total forward threshold voltage Vth3 for the LED units 511-514.

In this embodiment, the set voltage Vth32 may be a forward threshold voltage for each of the LED units 511-514, and the set voltage Vth31 may be a threshold voltage resulting from the sum of the forward threshold voltages for two LED units 511 and 512, 513 and 514.

Until the rectified voltage Vcc reaches the set voltage Vth32, the first and second LED units 51 and 52 remain turned off and do not emit light.

With an increase or decrease in voltage applied to the resistors R311*a* and R311*b* connected in series, the transistors T311*a*, T311*b*, T321*a*, T321*b* remain turned off, which leaves all of the transistors T312*a*, T312*b*, T322*a*, T322*b*, T312*c*, T322*c* in the turned on state.

Due to this, a closed loop of the first LED unit 511, the transistor T322*a*, and the second current detector 32*a*; a closed loop of the transistor T312*a*, the second LED unit 512, the transistor T322*b*, and the second current detector 32*a*; a closed loop of transistor T312*b*, the third LED unit 513, the transistor T312*c*, the second current detector 32*a*; a closed loop of the transistor T312*c*, the fourth LED unit 514, and the second current detector 32*a* are created, thereby causing the first to fourth LED units 511-514 to be electrically connected in parallel.

As mentioned above, since the rectified voltage Vcc has not yet reached the forward threshold voltage for each of the LED units 511-514, i.e., the set voltage Vth32, all of the first to fourth LED units 511-514 remain turned off, so the first and second LED units 51 and 52 do not emit light (see section P11 in (c) of FIG. 8).

While the first to fourth LED units 511-514 maintain the parallel connection state, when the rectified voltage Vcc increases to the set voltage Vth32, LED units 511-514 are turned on and emit light. At this time, the level of the current flowing through each of the LED units 511-514 corresponds to I23.

As the first to fourth LED units 511-514 are turned on, the transistors T311*a*, T312*a* are changed into the turned-on state from the turned-off state while the transistors T312*b*, T312*c* and transistors T322*a*, T322*c* are changed into the turned-off state from the turned-on state. The transistors T312*b*, T322B remain in the turned-on state.

With the connection of the first LED unit 511, the diode D412, the second LED unit 512, the transistor T322*b*, the second current detector 32*a*, LEDs in a first group G1 including the first and second LED units 511, 512 are connected in series; with the connection of the transistor T312*b*, the third LED unit 513, the diode D413, the fourth LED unit 514, the second current detector 32*a*, LEDs of a second group G2 including the third and fourth LED units 513, 514 are connected in series.

At this time, the second and third LED units 512, 513, i.e., the first LED group G1 and the second LED group G2, are connected in parallel with each other by means of the diode D411.

When the first and second LED groups G1 and G2 are each in the serial connection state, transistors T311*a*, T312*a* are changed back into the turned off state while the transistors T322*a*, T322*c* are changed into the turned-on state. This causes the first to fourth LED units 511-514 to be connected back in parallel with each other.

Until the level of the rectified voltage Vcc reaches the forward threshold voltage Vth31 for each of the first and second LED groups G1, G2 connected in series, the transistors T311*b*, T321*b* alternate between the turned-on state and the turned-off state, alternating the first and second LED units 511, 512 contained in the first LED group G1 between the parallel connection state and the serial connection state and alternating the third and fourth LED units 513, 514 contained in the second LED group G2 between the parallel connection state and the serial connection state.

When each of the first and second LED groups G1 and G2 is in the serial connection state and the first and second LED groups G1 and G2 are connected in parallel with each other, even if the level of the rectified voltage Vcc does not reach the forward threshold voltage Vth31 for the two LED units 511 and 512 or 513 and 514 connected in series, the LED units 511-514 remain turned on and the level of the current flowing through each of the LED units 511-514 remains to be I23 (see section P21 of (c) of FIG. 8).

While each of the first and second LED groups G1 and G2 is in the serial connection state and the first and second LED groups G1 and G2 are connected in parallel with each other, when the rectified voltage Vcc reaches the set voltage Vth31, the first and second LED units 511 and 512 connected in series by means of the diode D412 and the transistor T322*b* all conduct, and thus current flows through the first and second LED units 511 and 512 and the transistor T322*b*. The third and fourth LED units 513 and 514 connected in series also conduct together by means of the transistor T312*b* and the diode D413, and thus current flows through the first and second LED units 511 and 512 connected in series. At this time, the level of the current flowing through the LED units 511-514 corresponds to I22 as shown in (c) of FIG. 8.

When the first and second LED units 511, 512 (G1) connected in series are turned on and the third and fourth LED units 513, 514 (G2) connected in series are turned on, the first and second current detectors T311*a*, T311*b*, T321*a*, T321*b* are changed into the turned-on state, causing all the transistors T312*a*, T312*b*, T312*c*, T322*a*, T322*b*, T322*c* to be changed in the turned-off state.

This creates a path connecting the first LED unit 511, the diode D412, the second LED 512, the diode D411, the third LED unit 513, the diode D413, the fourth LED unit 514, and the second current detector 32*a*, which causes the first to fourth LED units 511-514 to be in the serial connection state.

The transistors T311*b*, T312*b* go back into the turned-off state and the transistors T213*b*, T322*b* back into the turned-on stage, which maintains the serial connection state of each of the first and second LED groups G1 and G2 but changes the first and second LED groups G1 and G2 to be connected in parallel with each other.

Due to this, as long as the rectified voltage Vcc is greater than the set voltage Vth31 and less than the set voltage Vth3, each of the first and second LED group G1 and G2 remains in the serial connection state but the first and second LED groups G1 and G2 alternate between parallel and serial connection states.

As described above, even though the set threshold voltage Vth31 of the rectified voltage Vcc is less than the total forward threshold voltage Vth3 to normally turn on all the first to fourth LED units 511-514 connected in series, the first to fourth LED units 511-514 operate in a saturated state at the voltage Vth31 and remain turned on even while maintaining the serial connection state (see section P31 of (c) of FIG. 8).

When the rectified voltage Vcc reaches the total forward threshold voltage Vth3, the first to fourth LED units 511-514 connected in series all conduct current I21 corresponding to the set voltage Vth3, thus increasing the luminous intensity of the first to fourth LED units 511-514.

When the rectified voltage Vcc reaches to the total forward threshold voltage Vth3, all of the transistors T311*a*, T311*b*, T321*a*, T321*b* are turned on by mean of the resistors R311*a*, R311*b*, R321*a*, R321*b* while all of the transistors T312*a*, T312*b*, T312*c*, T322*a*, T322*b*, T322*c* are turned off, which maintains the serial connection state of the first to fourth LED units 511-514.

When the rectified voltage Vcc exceeds the set voltage Vth3, as described above in connection with FIGS. 5 and 6, the first and second constant current units 21, 22 controls the level of current flowing through the first to fourth LED units 511-514 not to exceed the set current I21.

As long as the rectified voltage Vcc is greater than the set voltage Vth3, the level of the current flowing through the first to fourth LED units 511-514 remains the same as I21 (see section P41 of (c) of FIG. 8).

In (c) of FIG. 8, the apparatus for driving LEDs operates in sections P51, P61, and P71 in the same way as in the aforementioned sections P31, P21, and P11, respectively, as described above, so the description of them will be omitted herein.

As described herein, a current switch is implemented to detect current flowing through a Light Emitting Diode (LED) when an alternate current (AC) power source is applied and enable all LEDs to conduct current even below a total forward threshold voltage. Driving time for LEDs is increased, thus reducing the total harmonic distortion and improving the luminous intensity.

Overcurrent due to voltage fluctuations is prevented, which contributes to increase in reliability of the lighting devices.

Although preferred embodiments have been disclosed for illustrative purposes, those skilled in the art will appreciate that various modifications, additions and substitutions are possible, without departing from the scope and spirit of the embodiments in the accompanying claims.

What is claimed is:

1. An apparatus for driving Light Emitting Diodes (LEDs), in which the apparatus drives a first LED unit having at least one LED and a second LED unit connected to the first LED unit and having at least one LED, the apparatus comprising:

a rectifying unit for rectifying an Alternate Current (AC) power source connected to the first LED unit;

a first current detector connected between the rectifying unit and the first LED unit and having an operation state thereof changed depending on a level of current flowing through the first LED unit;

a second current detector connected between the rectifying unit and the second LED unit and having an operation state thereof changed depending on a level of current flowing through the second LED unit; and a reverse current protector connected between the first and second current detectors for providing a path to connect the first and second LED units in series, at least one constant current unit located at least one of between the rectifying unit and the first current detector and between the rectifying unit and the second current detector, wherein the first and second LED units are in a parallel connection state or a serial connection state depending on operation states of the first and second current detectors, and wherein the at least one constant current unit, when located between the rectifying unit and the first current detector, comprises:

a first transistor having the drain connected to the end of the rectifying unit;

a first resistor having an end connected to the end of the rectifying unit and the other end connected to the gate of the first transistor;

a second transistor having the collector connected to the other end of the first resistor and the base connected to the source of the first transistor; and a second resistor having an end connected to the source of the second transistor and the other end connected to the emitter of the second transistor and the first current detector.

2. The apparatus of claim 1, wherein the first current detector comprises:

a resistor having an end connected to the rectifying unit and the other end connected to the first LED unit;

a first transistor having the emitter connected to the end of the resistor, the base connected to the other end of the resistor, and the collector connected to the other end of the rectifying unit; and a second transistor having the gate connected to the collector of the first transistor, the drain connected to the other end of the resistor, and the source connected to an end of the reverse current protector, and wherein the second current detector comprises:

a resistor having an end connected to the rectifying unit and the other end connected to the second LED unit;

a first transistor having the collector connected to an end of the rectifying unit; and a second transistor having the gate connected to the collector of the first transistor, the source connected to the other end of the resistor, and the drain connected to the other end of the reverse current protector.

3. The apparatus of claim 1, wherein the at least one constant current unit, when located between the rectifying unit and the second current detector, comprises:

a second resistor having an end connected to the other end of the rectifying unit;

a first transistor having the source connected to the other end of the second resistor;

a second transistor having the emitter connected to the other end of the rectifying unit and the base connected to the other end of the second resistor; and a first resistor having an end connected to the collector of the second transistor and the gate of the first transistor and the other end connected between the drain of the first transistor and the second current detector.

4. An apparatus for driving Light Emitting Diodes (LEDs), in which the apparatus drives a first LED unit having at least one LED and a second LED unit connected to the first LED unit and having at least one LED, the apparatus comprising:

a rectifying unit for rectifying an Alternate Current (AC) power source connected to the first LED unit;

a first current detector connected between the rectifying unit and the first LED unit and having an operation state thereof changed depending on a level of current flowing through the first LED unit;

a second current detector connected between the rectifying unit and the second LED unit and having an operation state thereof changed depending on a level of current flowing through the second LED unit; and a reverse current protector connected between the first and second current detectors for providing a path to connect the first and second LED units in series, at least one constant current unit located between the rectifying unit and the second current detector, wherein the first and second LED units are in a parallel connection state or a serial connection state depending on operation states of the first and second current detectors, and wherein the at least one constant current unit comprises:

a second resistor having an end connected to the other end of the rectifying unit;

a first transistor having the source connected to the other end of the second resistor;

a second transistor having the emitter connected to the other end of the rectifying unit and the base connected to the other end of the second resistor; and a first resistor having an end connected to the collector of the second transistor and the gate of the first transistor and the other end connected between the drain of the first transistor and the second current detector.

* * * * *